UNITED STATES PATENT OFFICE.

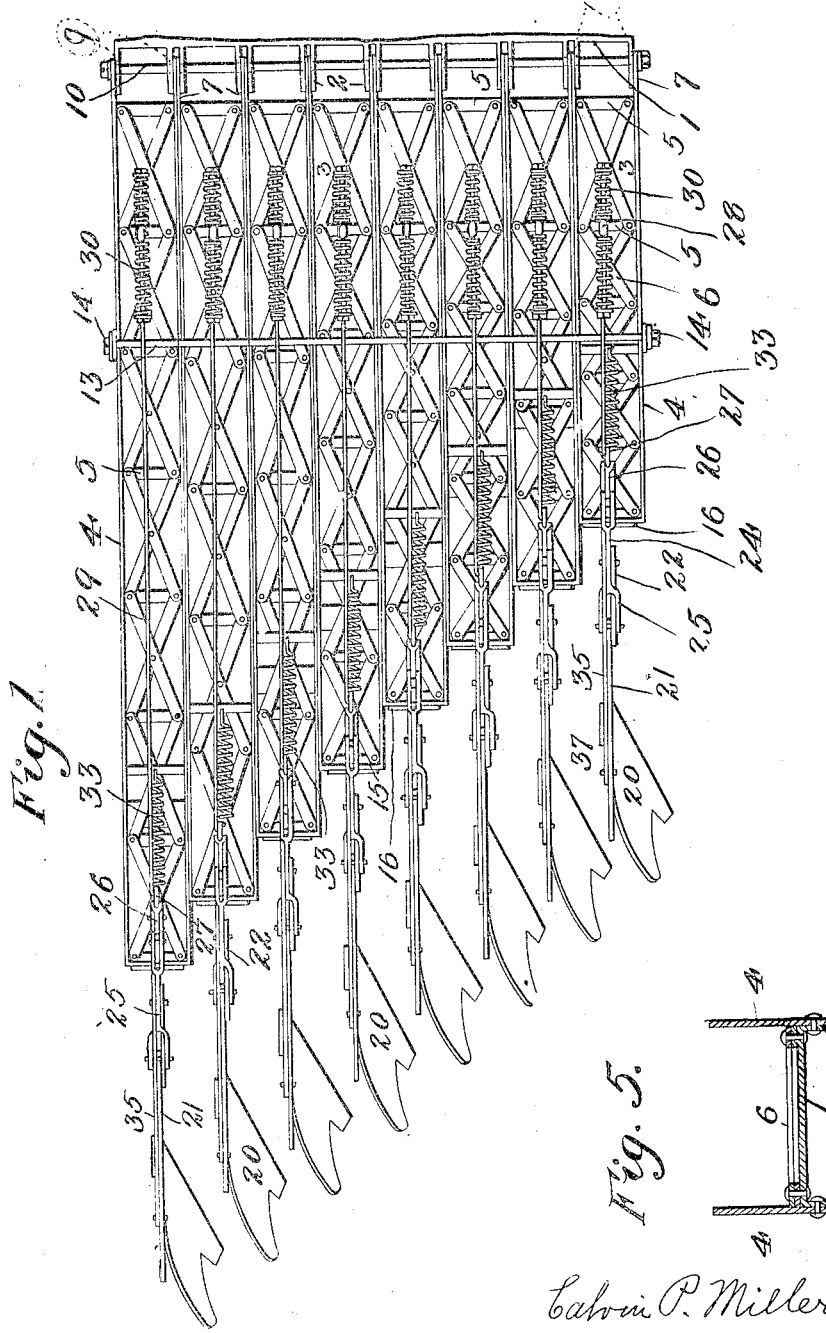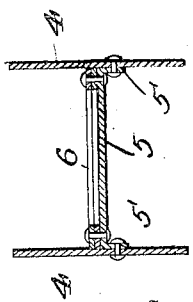

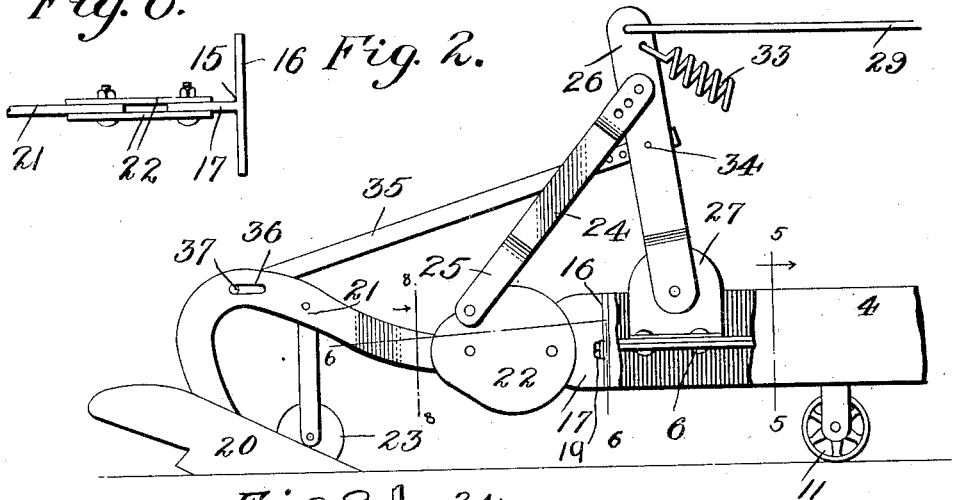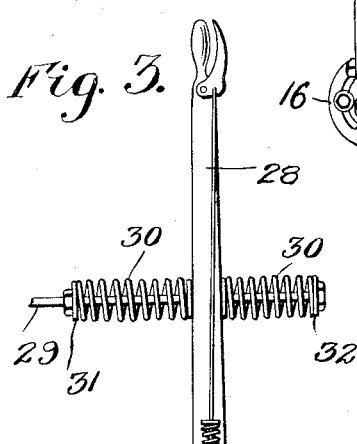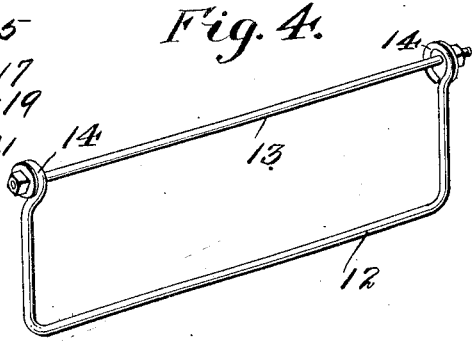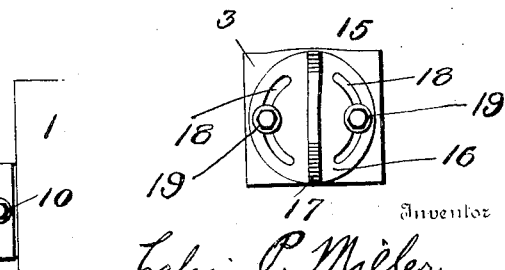

CALVIN P. MILLER, OF PIERRE, SOUTH DAKOTA, ASSIGNOR OF ONE-HALF TO A. W. EWERT, OF PIERRE, SOUTH DAKOTA, AND ONE-THIRD TO THE WILKINSON PLOUGH COMPANY, LIMITED, A CORPORATION OF CANADA.

GANG-PLOW.

959,953.  Specification of Letters Patent.  Patented May 31, 1910.

Application filed April 24, 1909. Serial No. 491,927.

*To all whom it may concern:*

Be it known that I, CALVIN P. MILLER, a citizen of the United States, residing at Pierre, in the county of Hughes and State of South Dakota, have invented certain new and useful Improvements in Gang-Plows, of which the following is a specification.

This invention relates to the class of gang plows and more particularly pertains to those plows which are operated by mechanical motive-power, such as steam.

The first object of my invention is to improve the general structure and efficiency of steam operated gang plows.

A further object is to improve the mechanism for regulating the position and cutting depth of the individual plows.

Further, it is an object of this invention to improve the means for harnessing the gang to the engine or other motive power and positioning the plows with relation to one another.

With these and other objects which will hereinafter appear, in view, my invention will now be fully set forth and described, reference being had to the accompanying drawings, which form a part of this specification, and in which, Figure 1, is a top plan view of my gang-plow, showing the positions of the plows as harnessed to the engine. Fig. 2, is a side elevation of one of the plows, showing in parts its operating mechanism. Fig. 3, is a sectional view of one of the hand-levers for operating the plows, showing its immediate connections with the operating mechanism. Fig. 4, is a detail perspective of one of the harnessing elements. Fig. 5, is a detail view, on the line 5—5 of Fig. 2. Fig. 6, is a detail sectional view on line 6—6 of Fig. 2, with braces 25 omitted and, Fig. 7, is a detail elevation of the plow-beam carrying bracket, and Fig. 8 is a detail elevation of one of the adjustable supports of the plow beams, taken on line 8—8 of Fig. 2 and looking in the direction of the arrow.

Referring more particularly to said drawings, in which like reference characters indicate like parts throughout, 1 is the rear-beam or bumper of the traction engine or other power machine (not shown) which is employed to draw the gang over the land to be cultivated. Said beam 1 is formed along its rear edge with a number of lugs or tongues 2, arranged in pairs to form a series of bifurcations, in the interstices of which the rear ends of the plow carriages 3 are adapted to be locked, as will appear hereinafter. Said plow carriages 3 each have a body formed of pairs of parallel longitudinal stringers 4, which may be formed of two members, but are preferably constructed of shaped steel in one U-shaped piece, as herein shown, and intermediate truss-work connecting said members 4. As shown in Fig. 1, the carriages 3 are constructed in successively increasing lengths and form a stepped series. Said truss-work joining the members 4 of each carriage comprises cross-bars 5 spaced along the length of stringers 4, and intervening diagonal-bars 6, all bolted or riveted together and to said stringers to form a composite structure of great strength. As shown in Fig. 5, the cross-bars 5 have downturned ends 5' which are bolted or riveted to stringers 4, and diagonal bars 6 are bolted or riveted to said cross-bars. The end of each stringer 4 is projected for a substantial distance beyond the last cross bars 5, so that each carriage is provided with a pair of forwardly projecting lugs 7, which are adapted to fit in the interstices formed by the lugs or tongues 2 above mentioned, and are each provided with a comparatively short longitudinal slot 8. Each pair of tongues 2 is spaced a sufficient distance apart to permit the entrance of the two adjacently lying lugs 7 of each two adjacent carriages 3, and all of said tongues 2 are provided with a series of alined apertures 9, through which, and the slots 8, formed in the lugs 7 of the carriages 3, a rod 10 is projected and secured as by nuts threaded on its ends. The above slotted connection permits a limited play of the carriages with relation to the traction engine. The forward end of each carriage is supported by a pivoted caster or wheel 11, secured preferably to the truss-work between the stringers 4.

It is evident from the above that each carriage is given an independent pivotally locked connection to the engine frame, and that the entire gang is harnessed in perfect and efficient alinement. It is also apparent that the provision of the slots 8 in the lugs 7 affords a limited play to the carriages independently of each other and the tractor, to allow for irregularities of the ground, both as to unevenness of surface and hardness of the soil.

As an additional means of maintaining the gang of plows in proper relative position, for gang work, a yoke 12 is provided. Said yoke 12 is, or may be, formed of a U-shaped bar, having rings or eyes 14 formed at the extremity of each arm, through which a rod 13 is adapted to be passed and bolted. As shown in Fig. 1, said yoke 12 is passed under the entire gang at a point between the engine and the plows, and is caused to embrace said gang, and is secured in position by passing the rod 13 through said eyes 14 and over said gang.

At the rear end of each carriage is secured a bracket 15. As all of said brackets are identical, and the operating mechanism for all of the plows is also identical, a description of one will suffice for all, and for this purpose attention is called to Figs. 2, 3, 6 and 7. Said bracket 15 comprises a substantially circular plate or disk 16 (Fig. 7) having a diametrical upstanding semicircular flange 17. Said plate 16 is mounted centrally on the end portion of carriage 3, so as to have a rotative movement or twist thereon, and is formed at each side with arcual slots 18, through which and the end of said carriage the bolts 19 are extended, so as to limit the rotation of said disk. The plow 20, through the intermediacy of the plow-beam 21 and the pivoted plates 22, hereinafter more fully described, is carried by said bracket 15, and through the arcual slot and bolt connection thereof, is permitted a certain degree of adjustment or freedom of placement, whereby to straighten the alinement and position of individual plows of the gang. This adjustment is dependent, of course on the operative position of the elevating levers and mechanism, hereinafter described, and is intended more as an alining means for the plows, relative to said mechanism and said carriages, than to permit any greater rotary movement. Each plow is also provided with a revoluble disk 23 supported adjacent its point from the beam 21.

Each plow 20 is provided with means for individual operation and adjustment. The plates 22, above mentioned, comprise a pair of identical egg-shaped links or cam disks, which are pivotally secured at their larger or butt ends to the semi-circular flange 17, one on each side, and receive between their smaller ends or points for pivotal connection, the end of the plow beam 21. At their upper edge, at a point behind the pivotal connection of the plow-beam thereto, the plates 22 are embraced by a lever-rod 24, whose arms 25 have a pivotal connection with said plates. Said arms 25 of lever rod 24 are spaced a sufficient distance apart to allow the plates 22 to be spaced at various distances from one another within a comparatively wide range. By this construction, provision is made for the insertion of plowbeams of varying thickness, and in practice, the distance of the arms 25 apart, and the consequent space allowed between plates 22 will be regulated by the thickness of standard plow-beams. The opposite end of lever rod 24 is joined by a pivotal connection to a lever 26, which is bifurcated at its lower end and is in turn pivoted to a semicircular plate 27, securely fastened, as by bolts or rivets to the truss-work or stringers 4 of carriage 3. Lever 26, has, in turn, a pivotal rod connection 29 with a hand-lever 28, said handlever 28, being positioned and locked by a locking bar and coöperating segmental rack. Said segmental-rack is also secured to the truss-work of the carriage 3, as by bolts or rivets. As will be seen in Figs. 1 and 3, said rod 29, is provided with a sliding connection through hand-lever 28 and is provided with coil springs 30, which inclose said rod, one on each side of lever 28 and between said lever and stops 31 and 32. By this means, the jar and racking usually attendant on gang plows in operation is taken up in the springs 30, instead of being communicated to the hand-lever 28 and the various elements of the carriage 3. In order to provide an additional means for supporting the plow 20 in elevated position, a coil-spring 33 is spanned between a point near the upper end of lever 26 and the bed or truss-work of carriage 3.

It is desirable, in the operation of gang plows, for the protection of the plow-points, that the points of the plows be first elevated from the earth, when the plow is thrown out of operative position. To this end I have provided a means which is operative simultaneously with the lifting mechanism whereby the plow-point will be the first to leave the soil. Pivotally connected at 34 to the lever 26 is a lever-rod 35, whose opposite end is connected to a point, preferably in the arch of the plow-beam 21. Said plow-beam, at this point is provided with a substantially longitudinal slot 36, through which and lever rod 35 is entered a bolt or pin 37, thereby completing a slot and pin connection. By this means when the plow is lifted this lever will not begin to lift on the plow until the pin 37 has reached the rear end of slot 36. Consequently lever 24, acting on the forward end of the plow-beam, will transmit an initial tilt to the plow to thrust its point upwardly and out of the earth, after which the lever 35 can come into play and further aid in the lifting of the entire plow.

It is evident from the above that the tractor traveling ahead of the gang plow, causes said gang to turn a successive series of furrows, and the number of furrows may be determined and varied by the individual manipulation of the plows. By means of hand-levers 28 and the intermediate connecting levers, the plows are readily raised and lowered at the will of the plow operator. Through the pivotal connection of the carriages to the tractor, and the provision of the yoke 12, the assemblage and disassemblage of the gang is readily effected. And it is also evident that the details of construction herein set forth, are only a preferred embodiment of the principles involved in the invention above described.

What I claim as new and desire to secure by Letters Patent of the United States is—

1. A steam gang plow comprising in combination with a tractor, a plurality of plow carriages mounted behind said tractor and having a limited longitudinal movement independent of said tractor, plows carried by said carriage, and means for yoking said carriages together behind said tractor.

2. A steam gang plow comprising in combination with a tractor, a plurality of plow carriages mounted behind said tractor and having a limited longitudinal movement independent of said tractor, plows carried by said carriage, and means for yoking said carriages together behind said tractor, said means comprising a U-shaped yoke embracing said carriages, and a rod joining its arms to entirely encircle said carriages.

3. A steam gang plow comprising in combination with a tractor, a plurality of plow carriages mounted behind said tractor and having a limited longitudinal movement independent of said tractor, plows carried by said carriage, and means for yoking said carriages together behind said tractor, said means comprising a U-shaped yoke embracing said carriage, eyes or rings carried by the arms of said yoke, and a rod entered through said eyes or rings to close said yoke.

4. A steam gang plow comprising in combination with a tractor, a plurality of plow carriages harnessed to said tractor, plows mounted on said carriages, and means for elevating and lowering said plows, said means comprising cam-plates pivoted to said carriages, and having the plow beams pivoted thereto, a vertical lever pivoted to said carriage, levers connecting said cam-plates and said plow beams to said vertical levers, and hand-levers in operative connection with said vertical lever.

5. A steam gang plow, comprising in combination with a tractor, a plurality of plow carriages harnessed to said tractor, plows mounted on said carriages, and means for elevating and lowering said plows, said means comprising cam-plates pivoted to said carriages, and having the plow beams pivoted thereto, a vertical lever pivoted to said carriage, levers connecting said cam-plates and said plow beams to said vertical levers, and hand levers in operative connection with said vertical lever, said levers connecting said plow beams and said vertical levers having pin and slot connections with said plow beams, whereby said levers do not act on said beams until the levers connecting the vertical levers and said cam plates have tilted said plows upwardly.

6. A steam gang plow comprising in combination with a tractor, a plurality of plow carriages harnessed to said tractor, plows connected to said carriages and means for raising and lowering said plows, said plows having a pivotal connection to said carriages comprising a pair of cam-plates pivoted at their butt ends to said carriages, pivotal connection with the plow beams, said plates lying on each side of said beams and being bolted thereto, and pivotal lever connection from said cam plates to said plow raising and lowering means.

7. A steam gang plow comprising in combination with a tractor, a plurality of plow carriages harnessed to said tractor, plows connected to said carriages, and means for raising and lowering said plows, said plows having a pivotal connection to said carriages comprising limitably rotatable disks secured to said carriages, a pair of cam plates pivoted at their butt ends to said disks, pivotal connection with the plow beams, said plates lying on each side of said beams and being bolted thereto, and pivotal lever connection from said cam plates to said plow raising and lowering means.

In testimony whereof I affix my signature in presence of two witnesses.

CALVIN P. MILLER.

Witnesses:
R. A. RUESS,
EDWARD R. WITMAN.